United States Patent [19]

Siller

[11] Patent Number: 4,880,710

[45] Date of Patent: Nov. 14, 1989

[54] ATMOSPHERIC OXYGEN ELEMENT WITH REGENERATING MANGANESE CHLORIDE SOLUTION AS ELECTROLYTE

[76] Inventor: Bruno Siller, Burgundstrasse 5, D-7090 Ellwangen, Fed. Rep. of Germany

[21] Appl. No.: 212,182

[22] Filed: Jun. 27, 1988

[30] Foreign Application Priority Data

Jun. 25, 1987 [DE] Fed. Rep. of Germany ....... 3720962

[51] Int. Cl.$^4$ .................................... H01M 12/06
[52] U.S. Cl. ........................................ 429/13; 429/29
[58] Field of Search .................. 429/27, 28, 29, 224, 429/13

[56] References Cited

U.S. PATENT DOCUMENTS

| | | | |
|---|---|---|---|
| 1,057,830 | 4/1913 | Heil | 429/224 |
| 1,899,615 | 2/1933 | Heise | 429/29 |
| 2,450,472 | 10/1948 | Bunham et al. | 429/29 |
| 3,497,391 | 2/1970 | Grulke | 429/27 |
| 4,442,183 | 4/1984 | Siller | 429/29 |
| 4,595,643 | 6/1986 | Koshiba et al. | 429/27 |

FOREIGN PATENT DOCUMENTS

| | | | |
|---|---|---|---|
| 0004049 | 3/1979 | Japan | 429/29 |
| 0123675 | 7/1983 | Japan | 429/224 |

Primary Examiner—Donald L. Walton
Attorney, Agent, or Firm—Cushman, Darby & Cushman

[57] ABSTRACT

An atmospheric oxygen element with a cathode of activated charcoal and carbon black. A manganese chloride solution is used as electrolyte. The anode consists of zinc sheets. The capacity of this element depends on the amount of $MnCl_2$. This amount can be increased by adding manganomanganite ($MN_2O_3$) produced by precipitation with an alkaline solution in the presence of oxygen. During the delivery of current, $ZnCl_2$ is created, which replaces the bivalent manganese in the manganite with zinc ions and thus dissolves $MnCl_2$.

5 Claims, No Drawings

ATMOSPHERIC OXYGEN ELEMENT WITH REGENERATING MANGANESE CHLORIDE SOLUTION AS ELECTROLYTE

BACKGROUND OF THE INVENTION

An atmospheric oxygen element is described in U.S. Pat. No. 4,442,183, the disclosure of which is hereby incorporated by reference. The atmospheric oxygen element described contains cathode plates, the active part of which comprise a mixture of activated charcoal and carbon black with a manganese (II) chloride solution as electrolyte. During discharge of the cell the zinc dissolves into $ZnCl_2$ and manganese chloride is transformed into $Mn(OH)_2$ at the cathode. Because of the oxygen contained in the atmospheric oxygen elements, the $Mn(OH)_2$ is oxidized into manganic acid and precipitates at the cathode as $Mn_2O_3$. The $Mn_2O_3$ reacts with the $ZnCl_2$, which increases during current delivery, in accordance with the formula:

$$Mn_2O_3 + ZnCl_2 \rightarrow ZnMnO_3 + MnCl_2$$

and since the $MnCl_2$ which has been created continues to react at the cathode, the total formula of current generation in an atmospheric oxygen element with a manganese chloride solution as electrolyte can be written as follows:

$$2Zn + 3/2 O_2 + MnCl_2 \rightarrow ZnMnO_3 + ZnCl_2$$

With this reaction it is of particular technical interest that it is possible to react 4 equivalents of zinc to generate current with 1 mol $MnCl_2$.

Oxygen is available in unlimited amounts, and the amount of zinc required is easily attainable by the choice of the thickness of the anode. However, the amount of $MnCl_2$ is tied to the amount of electrolyte which can be accommodated in the cell. Solid $MnCl_2 \cdot 4(H_2O)$ cannot be added to the solution in excess, since it dissolves in moist air and would cause swelling of the cells.

It is therefore an object of the present invention to provide a practical process for generating $MnCl_2$ in the electrolyte of an atmospheric oxygen element as needed.

It is also an object to provide an atmospheric oxygen element with a source of generating $MnCl_2$ in the electrolyte.

SUMMARY OF THE INVENTION

In accordance with the above objects, there has been provided a process for generating $MnCl_2$ in the electrolyte of the cathode of an atmospheric oxygen element comprising the following steps. First, a manganese (II) salt solution is precipitated by adding one equivalent of hydroxide for every equivalent of $Mn++$ in the presence of oxygen, whereby $Mn_2O_3$ is produced. Second, the insoluble $Mn_2O_3$ is added to the electrolyte of the cathode. Third, the $ZnCl_2$ concentration is enriched in the cell during current flow. Fourth, the added $Mn_2O_3$ reacts with the $ZnCl_2$ to produce $ZnMnO_3$ and $MnCl_2$. The desired $MnCl_2$ in the element is thereby generated.

Also in accordance with the above objects, a second embodiment provides a process for generating $MnCl_2$ in the electrolyte of the cathode of an atmospheric oxygen element comprising the following steps. First, $Mn(OH)_2$ is precipitated from a manganese (II) salt solution by the addition of alkali in the absence of oxygen. Second, the $Mn(OH)_2$ of the first step is purified. Third, the purified $Mn(OH)_2$ of the second step is added to the electrolyte of the cathode, whereby $Mn_2O_3$ is formed by oxygen uptake during mixing of the depolarization mass. Fourth, the $ZnCl_2$ concentration is enriched during current flow in the cell. Fifth, the $Mn_2O_3$ formed reacts with the $ZnCl_2$ to produce $ZnMnO_3$ and $MnCl_2$. The desired $MnCl_2$ in the elements is thereby generated.

Preferably, the third step of the second embodiment further comprises adding moist $Mn(OH)_2$ to the electrolyte, and further comprises the step, before the fourth step, of saturating the water added with the $Mn(OH)_2$ by the addition of $MnCl_2 \cdot 4H_2O$.

The present invention also preferably provides an atmospheric oxygen element comprising: a zinc anode; a cathode having an aqueous $MnCl_2$ electrolyte; and a non-soluble $Mn_2O_3$ material in the electrolyte for producing $MnCl_2$ in the electrolyte when current is produced in the element.

BRIEF DESCRIPTION OF THE PREFERRED EMBODIMENTS

In accordance with the invention an insoluble material is therefore added, which only gives off $MnCl_2$ by the formation of $ZnCl_2$ during current delivery. Manganomanganite ($Mn_2O_3$) is proposed as such, preferably as formed during precipitation from a manganese salt solution with an equivalent amount of an alkaline solution in the presence of oxygen. This product can be added to the electrolyte of the cathode in the form of a dry or wet powder.

Another way of proceeding is to precipitate $Mn(OH)_2$ from the manganese salt solution with an alkaline solution in the absence of air. The substance purified by the alkaline salt is added, preferably wet, to the cathode mixture. The formation of manganite ($Mn_2O_3$) occurs during the mixing process with the addition of oxygen. The water introduced into the mixture by the above reaction and along with the precipitated $Mn(OH)_2$ is saturated with salt by a corresponding addition of $MnCl_2 \cdot 4(H_2O)$.

However, the manganite produced does not have to be in electronically conducting contact with the cathode. If the design of the cell permits it, it can also be provided at another place in the electrolyte.

The following examples illustrate how the cathode mixture of the present invention is produced.

Example I: Mixture with the addition of dry $Mn_2O_3$ (a) 5 kg carbon black, 5 kg activated charcoal, 5 kg powdered $Mn_2O_3$ and 15 kg of a saturated $MnCl_2$ solution are placed in a mixing drum and mixed until a loose powder mixture is obtained.

(b) If the $Mn_2O_3$ is added moist, that is, without having been dried, the water content is determined and 2 kg $MnCl_2 \cdot 4H_2O$ is added for every kg of water present. 3 kg saturated Managanese chloride solution is thereby produced.

If, for example, the added $Mn_2O_3$ contains 2 kg water for every five kg of dry material, the same mixture as in I(a), above, is obtained with the following components: 5 kg carbon black, 5 kg activated charcoal, 7 kg moist $Mn_2O_3$, 4 kg $MnCl_2 \cdot 4H_2O$, and 9 kg saturated $MnCl_2$ solution.

Example II: A mixture having the same composition as Example I after oxidation by atmospheric oxygen.

The moisture content of the Mn(OH)$_2$ is 2 kg water per 5 kg Mn(OH)$_2$ If Mn(OH)$_2$ is used, then 5.6 kg of the dry product must be used; this results in 7.84 kg moist Mn(OH)$_2$ with 2.24 kg water. As a result of oxidizing 5.6 kg Mn(OH)$_2$ to 5 kg Mn$_2$O$_3$, 1.13 kg of water is formed so that the water content becomes 3.37 kg (i.e., 2.24+1.13=3.37). One must therefor add 6.74 kg of solid MnCl$_2$·4H$_2$O, and 10.11 kg saturated Manganese chloride solution results.

The composition of the mixture is therefore as follows: 5 kg carbon black, 7.84 kg moist Mn(OH)$_2$, 6.74 kg MnCl$_2$·4H$_2$O, and 8.26 kg of saturated MnCl$_2$ solution.

Although specific embodiments are described it will be apparent to one of ordinary skill in the art that modifications can be made within the scope of the present invention which is determined by the appended claims.

What is claimed is:

1. A process for generating MnCl$_2$ in the electrolyte of the cathode of an atmospheric oxygen element having an aqueous MnCl$_2$ electrolyte and a Zn electrode, comprising the steps of:
    (a) precipitating a manganese (II) salt solution by adding one equivalent of hydroxide for every equivalent of Mn++ in the presence of oxygen, whereby water insoluble Mn$_2$O$_3$ is produced;
    (b) adding said water insoluble Mn$_2$O$_3$ to the electrolyte of the cathode;
    (c) producing current through said element whereby ZnCl$_2$ is produced in said electrolyte; and
    (d) reacting said ZnCl$_2$ with the Mn$_2$O$_3$ added in (b), whereby ZnMnO$_3$ and MnCl$_2$ are produced and whereby the desire MnCl$_2$ is generated.

2. A process for generating MnCl$_2$ in the electrolyte of the cathode of an atmospheric oxygen element having an aqueous MnCl$_2$ electrolyte and a Zn electrode, comprising the steps of:
    (a) precipitating Mn(OH)$_2$ from a manganese (II) salt solution by the addition of alkali in the absence of oxygen;
    (b) purifying the Mn(OH)$_2$ of step (a);
    (c) adding the purified Mn(OH)$_2$ of step (b) to the electrolyte aqueous of the cathode, whereby Mn$_2$O$_3$ is formed by oxygen uptake during mixing of the depolorization mass;
    (d) producing current through said element whereby ZnCl$_2$ is produced in said electrolyte aqueous.
    (e) reacting said ZnCl$_2$ with the Mn$_2$O$_3$ produced in (c), whereby ZnMnO$_3$ and MnCl$_2$ are produced and whereby the desired MnCl$_2$ is generated.

3. A process according to claim 2, wherein step (c) further comprises adding moistened Mn(OH)$_2$ with water to said electrolyte aqueous, and further comprising the step, before step (d) of saturating the water added with the Mn(OH)$_2$ by the addition of MnCl$_2$·4H$_2$O.

4. An atmospheric oxygen element, comprising:
    a zinc anode;
    a cathode having an aqueous MnCl$_2$ electrolyte; and
    a non-soluble Mn$_2$O$_3$ material in said electrolyte for producing MnCl$_2$ in said electrolyte when current is produced in said element.

5. An element according to claim 4, wherein Mn(OH)$_2$ is added to said MnCl$_2$ electrolyte and said Mn$_2$O$_3$ material is produced by oxygen uptake during said addition.

* * * * *